US011093792B2

(12) United States Patent
Jiang et al.

(10) Patent No.: US 11,093,792 B2
(45) Date of Patent: *Aug. 17, 2021

(54) IMAGE PROCESSING METHODS AND DEVICES

(71) Applicant: Advanced New Technologies Co., Ltd., Grand Cayman (KY)

(72) Inventors: Nan Jiang, Zhejiang (CN); Mingyu Guo, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 135 days.

This patent is subject to a terminal disclaimer.

(21) Appl. No.: 16/577,191

(22) Filed: Sep. 20, 2019

(65) Prior Publication Data

US 2020/0012885 A1 Jan. 9, 2020

Related U.S. Application Data

(63) Continuation of application No. PCT/CN2018/096278, filed on Jul. 19, 2018.

(30) Foreign Application Priority Data

Jul. 20, 2017 (CN) .......................... 201710594226.2

(51) Int. Cl.
*G06K 9/62* (2006.01)
*G06K 9/64* (2006.01)

(52) U.S. Cl.
CPC ......... *G06K 9/6215* (2013.01); *G06K 9/6202* (2013.01); *G06K 9/6253* (2013.01); *G06K 9/64* (2013.01)

(58) Field of Classification Search
CPC ............. G06K 9/00288; G06K 9/6202; G06K 9/6215; G06K 9/6253; G06K 9/64
See application file for complete search history.

(56) References Cited

U.S. PATENT DOCUMENTS 9,424,470 B1 * 8/2016 Hinterstoisser ........ B25J 9/0093
2007/0172099 A1 * 7/2007 Park ..................... G06K 9/6234
382/118

(Continued)

FOREIGN PATENT DOCUMENTS

CN 105069426 A 11/2015
CN 105117692 A 12/2015

(Continued)

OTHER PUBLICATIONS

International Search Report for International Application No. PCT/CN2018/096278, dated Sep. 26, 2018.

(Continued)

*Primary Examiner* — Ian L Lemieux
(74) *Attorney, Agent, or Firm* — Finnegan, Henderson, Farabow, Garrett & Dunner, LLP

(57) ABSTRACT

A method for image processing includes: acquiring features of multiple images of a target object and a standard feature of the target object; and determining trusted images of the target object from the multiple images of the target object according to similarities between the features of the multiple images of the target object and the standard feature thereof, wherein similarities between features of the trusted images of the target object and the standard feature of the target object meet a preset similarity requirement. The image processing method may be applied to application scenarios such as image comparison, identity recognition, target object search, and similar target object determination.

14 Claims, 8 Drawing Sheets

Trusted image   Untrusted image   Trusted image   Trusted image

(56) References Cited

U.S. PATENT DOCUMENTS

| | | | | |
|---|---|---|---|---|
| 2008/0152225 | A1* | 6/2008 | Iwamoto | G06K 9/6212 |
| | | | | 382/190 |
| 2008/0279424 | A1* | 11/2008 | Berrani | G06K 9/00288 |
| | | | | 382/118 |
| 2009/0138788 | A1* | 5/2009 | Hahn | G16H 30/20 |
| | | | | 715/200 |
| 2011/0150280 | A1* | 6/2011 | Tsuji | G06T 7/248 |
| | | | | 382/103 |
| 2015/0309569 | A1* | 10/2015 | Kohlhoff | G06F 3/04842 |
| | | | | 345/156 |
| 2016/0012311 | A1* | 1/2016 | Romanik | G06K 9/6203 |
| | | | | 382/201 |
| 2016/0012593 | A1* | 1/2016 | Chao | G06T 7/73 |
| | | | | 382/209 |
| 2016/0104042 | A1* | 4/2016 | Romanik | G06T 7/33 |
| | | | | 382/103 |
| 2016/0283779 | A1* | 9/2016 | McPhie | G06K 9/6254 |
| 2018/0189543 | A1* | 7/2018 | Gottemukkula | G06K 9/6201 |
| 2020/0250406 | A1* | 8/2020 | Wang | G06K 9/00275 |
| 2020/0410280 | A1* | 12/2020 | Wu | G06F 16/583 |
| 2021/0042565 | A1* | 2/2021 | Wu | G06F 16/51 |

FOREIGN PATENT DOCUMENTS

| | | |
|---|---|---|
| CN | 105320954 A | 2/2016 |
| CN | 105678778 A | 6/2016 |
| CN | 106339695 A | 1/2017 |
| CN | 106560840 A | 4/2017 |
| CN | 106875419 A | 6/2017 |
| JP | 2003162689 A | 6/2003 |
| JP | 2008537216 A | 9/2008 |

OTHER PUBLICATIONS

Office Action of Korean Application No. 10-2019-7025770 dated Jan. 25, 2021.

First Written Opinion for Application No. 11201907444Y, issued by the Intellectual Property Office of Singapore, dated Jul. 24, 2020.

Second Written Opinion for Application No. 11201907444Y, issued by the Intellectual Properly Office of Singapore, dated Jan. 21, 2021.

Extended Search Report for European Application No. 18835563.0 from the European Patent Office, dated Mar. 23, 2020.

Berrani, S-A., et al., *Enhancing Face Recognition from Video Sequences using Robust Statistics*, IEEE Conference on Advanced Video and Signal Based Surveillance, Italy, Sep. 15-16, 2015, pp. 324-329.

Satoh, S, *Comparative Evaluation of Face Sequence Matching for Content-based Video Access*, Fourth IEEE International Conference on Automatic Face and Gesture Recognition, France, Mar. 28-30, 2000, pp. 163-168.

Shan, C., *Face Recognition and Retrieval in Video*, Jan. 1, 2010, Springer Berlin Heidelberg, Berlin, Heidelberg, pp. 235-260.

Zhao, M., et al., *Large Scale Learning and Recognition of Faces in Web Videos*, 8th IEEE International Conference on Automatic Face & Gesture Recognition, Sep. 17, 2008, 7 pgs.

Office Action of Japanese Application No. 2019-545984 dated Apr. 1, 2021.

Examination Report of Indian Application No. 201937032797, dated May 31, 2021.

* cited by examiner

IMAGE PROCESSING METHODS AND DEVICES

CROSS-REFERENCE TO RELATED APPLICATIONS

This application is a continuation application of International Application No. PCT/CN2018/096278, filed on Jul. 19, 2018, which is based upon and claims priority to Chinese Patent Application No. 201710594226.2, filed on Jul. 20, 2017, the entire content of all of which is incorporated herein by reference.

TECHNICAL FIELD

This application relates to the field of image processing, and in particular, to methods and devices for image processing.

TECHNICAL BACKGROUND

With the development of image processing technologies, image processing has been applied in many fields, such as face-recognition based payment and identity recognition. During image processing, it is usually necessary to take images saved in a system as a processing basis to obtain a processing result by processing the images saved in the system. For example, a base image saved in the system is compared with a collected user image to verify the user identity.

For the same target object, as images of the target object saved in the system vary in quality, it is necessary to provide a technical solution to select high-quality images of the target object from multiple base images of the target object, thus an effect of image processing may be improved.

SUMMARY

In a first aspect, there is provided a method for image processing. The method includes acquiring features of multiple images of a target object and a standard feature of the target object; and determining trusted images of the target object from the multiple images according to similarities between the features of the multiple images and the standard feature, wherein similarities between features of the trusted images and the standard feature meet a preset similarity requirement.

In a second aspect, there is provided a method for image processing. The method includes: acquiring trusted images of a first target object and trusted images of a second target object; and according to the trusted images of the first target object and the trusted images of the second target object, determining whether the first target object is similar to the second target object, wherein the trusted images of the first target object are determined from multiple images of the first target object, and similarities between features of the trusted images of the first target object and a standard feature of the first target object meet a first preset similarity requirement; the trusted images of the second target object are determined from multiple images of the second target object, and similarities between features of the trusted images of the second target object and a standard feature of the second target object meet a second preset similarity requirement.

In a third aspect, there is provided a method for image processing. The method includes: acquiring features of multiple images of a first target object, a standard feature of the first target object, features of multiple images of a second target object, and a standard feature of the second target object; determining trusted images of the first target object from the multiple images of the first target object according to similarities between the features of the multiple images of the first target object and the standard feature of the first target object, and determining trusted images of the second target object from the multiple images of the second target object according to similarities between the features of the multiple images of the second target object and the standard feature of the second target object, wherein similarities between features of the trusted images of the first target object and the standard feature of the first target object meet a first preset similarity requirement, and similarities between features of the trusted images of the second target object and the standard feature of the second target object meet a second preset similarity requirement; and according to the trusted images of the first target object and the trusted images of the second target object, determining whether the first target object is similar to the second target object.

In a fourth aspect, there is provided an image processing device, including: a processor; and a memory storing instructions, wherein when executed, the instructions cause the processor to: acquire features of multiple images of a target object and a standard feature of the target object; and determine trusted images of the target object from the multiple images according to similarities between the features of the multiple images and the standard feature, wherein similarities between features of the trusted images and the standard feature meet a preset similarity requirement.

In a fifth aspect, there is provided an image processing device including: a processor; and a memory storing instructions, wherein when executed, the instructions cause the processor to: acquire trusted images of a first target object and trusted images of a second target object; and determine whether the first target object is similar to the second target object according to the trusted images of the first target object and the trusted images of the second target object, wherein the trusted images of the first target object are determined from multiple images of the first target object, and similarities between features of the trusted images of the first target object and a standard feature of the first target object meet a first preset similarity requirement; the trusted images of the second target object are determined from multiple images of the second target object, and similarities between features of the trusted images of the second target object and a standard feature of the second target object meet a second preset similarity requirement.

In a sixth aspect, there is provided an image processing device, including: a processor; and a memory configured to store instructions, wherein when executed, the instructions cause the processor to: acquire features of multiple images of a first target object, a standard feature of the first target object, features of multiple images of a second target object, and a standard feature of the second target object; determine trusted images of the first target object from the multiple images of the first target object according to similarities between the features of the multiple images of the first target object and the standard feature of the first target object, and determine trusted images of the second target object from the multiple images of the second target object according to similarities between the features of the multiple images of the second target object and the standard feature of the second target object, wherein similarities between features of the trusted images of the first target object and the standard feature of the first target object meet a first preset similarity requirement, and similarities between features of the trusted images of the second target object and the standard feature of the second target object meet a second preset similarity requirement; and according to the trusted images of the first target object and the trusted images of the second target object, determine whether the first target object is similar to the second target object.

In a seventh aspect, there is provided a computer-readable storage medium having stored thereon instructions that, when executed by a processor of a device, cause the device to perform the method according the first aspect.

In an eighth aspect, there is provided a computer-readable storage medium having stored thereon instructions that, when executed by a processor of a device, cause the device to perform the method according the second aspect.

In a ninth aspect, there is provided a computer-readable storage medium having stored thereon instructions that, when executed by a processor of a device, cause the device to perform the method according the third aspect.

With the technical solutions in the embodiments, trusted images more similar to a standard feature of a target object and capable of reflecting the standard feature of the target object can be determined from multiple images of the target object based on the standard feature of the target object, so that all the selected trusted images are suitable for image processing, thus improving an effect of image processing.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

Embodiments of the specification will be described below with reference to the accompanying drawings. The described embodiments are only examples rather than all of the embodiments consistent with the specification. All other embodiments derived by those of ordinary skill in the art based on the example embodiments without creative efforts should fall within the protection scope of this application.

Embodiments of the specification provide methods and apparatuses for image processing, in which trusted images of a target object may be selected in multiple images of the target object. Whether the target object is similar to another target object may be determined based on the trusted images of the target object. The trusted images of the target object selected may be more similar to a standard feature of the target object, and may reflect the standard feature of the target object.

Figure 1:
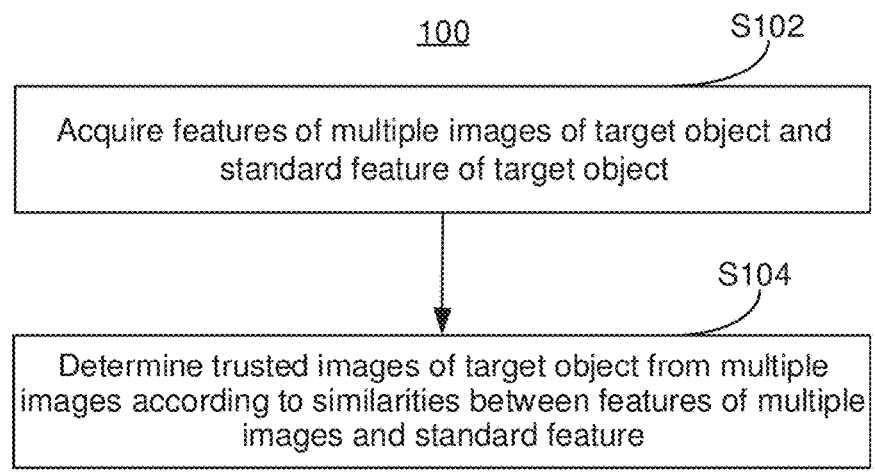
FIG. 1 is a flowchart of an image processing method according to an embodiment.

FIG. 1 is a flowchart of an image processing method 100 according to an embodiment. The method 100 may be performed by a computer, e.g., a server. As shown in FIG. 1, the method 100 includes the following steps.

In step S102, the computer acquires features of multiple images of a target object and a standard feature of the target object.

In step S104, the computer determines trusted images of the target object from the multiple images according to similarities between the features of the multiple images and the standard feature. In some embodiments, similarities between features of the trusted images and the standard feature may meet a preset similarity requirement.

In the image processing method 100, the computer may acquire features of multiple images of a target object and a standard feature of the target object. The computer may determine trusted images of the target object from the multiple images according to similarities between the features of the multiple images and the standard feature. In some embodiments, similarities between features of the trusted images and the standard feature may meet a preset similarity requirement. As can be seen, according to the image processing method 100, the computer may determine trusted images more similar to and capable of reflecting the standard feature of the target object from the multiple images of the target object based on the standard feature of the target object. In this way, the selected trusted images may be suitable for image processing. Thus, an effect of image processing may be improved.

In some embodiments, the target object may be a natural person or an article. In the step S102, in some embodiments, multiple pre-stored images of a target object may be read from a local database or a remote database. In some embodiments, the computer may acquire the features of the multiple images of the target object, and each image of the target object may have a corresponding feature.

In some embodiments, the standard feature of the target object may be a feature that may reflect the target object accurately. By selecting trusted images from the multiple images using the feature reflecting the target object accurately, the trusted images may be ensured to also reflect the target object accurately. Considering that the standard feature may reflect the target object accurately, in this embodiment, the standard feature of the target object may be acquired by the following manner (a1) or (a2).

(a1) The computer may acquire an average feature of the multiple images, and determine it as the standard feature of the target object.

(a2) The computer may acquire an average feature of the multiple images, and determine a feature in the features of the multiple images that is most similar to the average feature as the standard feature of the target object.

In the manner (a1), the computer may average features of the multiple images of the target object. In some embodiments, the computer may determine a specific averaging method according to an actual implementation scenario, which is not limited here. In a specific implementation scenario, the computer may average same-dimension feature vectors of all acquired images, and obtain an average feature of the acquired images. In this manner, the computer may determine the average feature of all the acquired images as the standard feature of the target object.

In the manner (a2), the computer may acquire an average feature of the multiple images. This process may be the same as in the manner (a1), and will not be elaborated here. As each image of the target object has a corresponding feature, the computer may determine a feature most similar to the average feature from the features of the multiple images as the standard feature of the target object. In some embodiments, the computer may calculate a similarity between the feature of each of the multiple images of the target object and the average feature to obtain an image with the highest similarity. The computer may determine the feature of the image with the highest similarity as the standard feature of the target object. In this manner, the computer may obtain an image having a feature most similar to the average feature, to be the standard image. The standard image may reflect the standard feature of the target object, and may be used in other image processing processes of the target object.

It can be seen by comparing the manners (a1) and (a2) that the process of determining the standard feature may be relatively simple and easy to operate in the manner (a1). A standard image most similar to the standard feature may be further obtained in the process of determining the standard feature in the manner (a2), thus facilitating other image processing processes of the target object. Those of ordinary skill in the art may select the manner (a1) or the manner (a2) according to an actual situation to determine the standard feature of the target object.

In the step S104, in some embodiments, the computer may determine the trusted images of the target object from the multiple images according to similarities between the features of the multiple images and the standard feature in the following manner (b1) or (b2).

(b1) The computer may determine some or all images among the multiple images as the trusted images of the target object, wherein the trusted images have similarities between their features and the standard feature, and the similarities may be greater than or equal to a preset similarity threshold.

(b2) The computer may determine distribution data of the similarities between the features of the multiple images and the standard feature. The computer may then determine a similarity interval in the distribution data, in which an image density may be greater than or equal to a preset density. The computer may further determine some or all images corresponding to the determined similarity interval as the trusted images of the target object.

In the manner (b1), the computer may respectively calculate a similarity between a feature of each image in the multiple images of the target object and the standard feature of the target object. The computer may then determine multiple images having similarities greater than or equal to the preset similarity threshold. In this manner, it may be appreciated that the multiple images may be close to the standard feature of the target object, and reflect the standard feature of the target object. However, the calculation speed may be affected as the quantity of the multiple images may be very large. Therefore, in this manner, if not considering the calculation speed, all of the determined multiple images may be taken as the trusted images of the target object. If considering the calculation speed, some of the determined multiple images may be determined as the trusted images of the target object. In some embodiments, the preset similarity threshold may be a value preset by a computer. For example, the computer may set the preset manner according to an implementation scenario.

In an embodiment, the computer may calculate a similarity between a feature of each image in the multiple images of the target object and the standard feature of the target object. The computer may sort the multiple images of the target object in a descending order, from the highest similarity to the lowest similarity. In the sorting, the computer may determine images having similarities greater than or equal to the preset similarity threshold. Considering the requirement for the calculation speed, if the quantity of the images having similarities greater than or equal to the preset similarity threshold is greater than or equal to a certain value (e.g., 100), the computer may select the first half of the certain quantity of the images (50 images in this case) having similarities greater than or equal to the preset similarity threshold in the descending order of the similarity as the trusted images of the target object. If the quantity of the images having similarities greater than or equal to the preset similarity threshold is less than a certain value, the computer may select the first half of the quantity of the images having similarities greater than or equal to the preset similarity threshold in the descending order of the similarity as the trusted images of the target object.

Figure 2A:
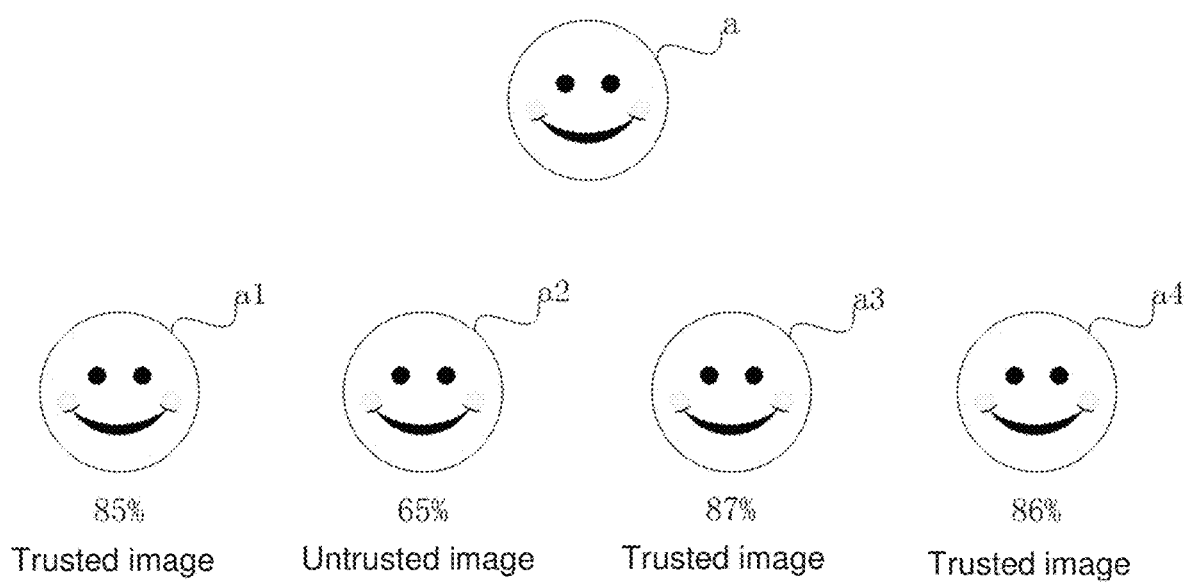
FIG. 2A is a schematic diagram of determining trusted images of a target object according to a standard image of the target object, according to an embodiment.

In some embodiments, the standard feature of the target object may be a feature of a standard image of the target object. FIG. 2A is a schematic diagram of determining trusted images of a target object according to a standard image of the target object according to an embodiment. As shown in FIG. 2A, the target object may be a natural person. An image a is a standard image of the target object. Images a1, a2, a3, and a4 are some images in the multiple acquired images of the target object. Similarities between the standard image a and the images a1, a2, a3, and a4 may be calculated respectively as 85%, 65%, 87%, and 86%. The preset similarity threshold may be set to be 80%. The computer may determine that a1, a3, and a4 are trusted images of the target object, and a2 is an untrusted image.

In the manner (b2), in some embodiments, the computer may respectively calculate a similarity between a feature of each image in the multiple images of the target object and the standard feature of the target object to obtain multiple pieces of similarity data. The computer may conduct statistical analysis in a distribution of the multiple pieces of similarity data to obtain distribution data. The computer may present the distribution data in the form of a statistical distribution histogram. The distribution data may include multiple similarity intervals. The computer may mark the quantity of images corresponding to each similarity interval. The computer may determine a similarity interval in the distribution data, in which an image density is greater than or equal to a preset density. Here, the image density may be represented with a ratio of the quantity of images in the similarity interval to a similarity range of the similarity interval. A greater image density may indicate a larger quantity of images corresponding to each similarity unit in the similarity interval. The preset density may be a value preset by the computer, and may be set by the computer according to a scenario requirement. After determining the similarity interval in which an image density is greater than or equal to a preset density, similar to that in the manner (b1), if not considering the calculation speed, the computer may determine all images in the determined similarity interval as the trusted images of the target object. If considering the calculation speed, the computer may determine some images in the determined similarity interval as the trusted images of the target object. It should be noted that an image within the similarity interval in which the image density is greater than or equal to the preset density may not necessarily be the one most similar to the standard feature.

In the manner (b2), in some embodiments, images distributed within the similarity interval in which the image density is greater than or equal to the preset density may mainly be normal images of the target object. For example, if the target object is a natural person who often laughs when taking photos, images distributed within the similarity interval in which the image density is greater than or equal to the preset density may mainly be laughing images of the target object when conducting statistical analysis on the distribution data of the target object. By determining some or all of the images in the similarity interval in which the image density is greater than or equal to the preset density as the trusted images, the trusted images of the target object may be normal images of the target object.

Figure 2B:
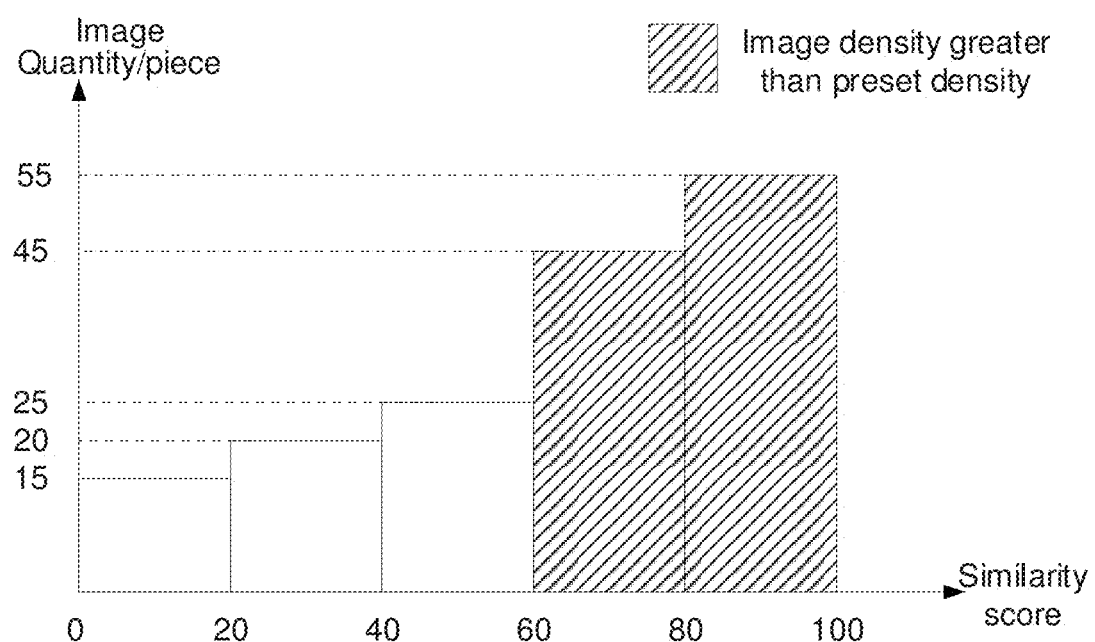
FIG. 2B is a schematic diagram of a distribution of similarities between features of multiple images and a standard feature according to an embodiment.

FIG. 2B is a schematic diagram of distribution of similarities between features of multiple images and a standard feature according to an embodiment of this application. As shown in FIG. 2B, the computer obtains a statistical distribution histogram according to distribution data of a similarity between a feature of each image of a target object and a standard feature of the target object. The histogram includes multiple similarity intervals, and the quantity of images corresponding to each similarity interval is marked. In the histogram, similarity intervals in which an image density is greater than or equal to a preset density may include an interval having similarity scores between 60 and 80 and an interval having similarity scores between 80 and 100, which are shaded in the histogram. The computer may determine some or all images corresponding to the two intervals as trusted images of the target object.

It may be seen by comparing the manners (b1) and (b2) that in the manner (b1), the computer may determine the trusted images of the target object from the multiple images of the target object mainly based on a preset similarity threshold. In the manner (b2), the computer may determine the trusted images of the target object from the multiple images of the target object mainly based on distribution data of similarities. When the multiple images of the target object are all images of the target object itself, the computer may simply and rapidly obtain trusted images of the target object close to the standard feature of the target object in the manner (b1). When a small amount of impurity images (such as meaningless images or images of other target objects) are mixed into the multiple images of the target object, the interference from the impurity images may be avoided in the manner (b2), and normal images of the target object may be taken as trusted images of the target object. Those of ordinary skill in the art may select the manner (b1) or the manner (b2) according to an actual situation to determine the trusted images of the target object.

In the manner (b2), in some embodiments, when the trusted images are determined based on similarity distribution, if an isolated image with a high similarity is determined in distribution data of the similarities (e.g., a similarity score between one mere image and the standard feature is 98 and the similarity scores between the remaining images and the standard feature is at most 90), the isolated image with the high similarity may overlap perfectly with the standard feature, or may be an image with errors in calculation. In this situation, the computer may exclude the image to ensure the accuracy of image selection. Alternatively, the image may not be excluded, depending on a specific scenario.

It can be seen from the process that when trusted images of a target object are determined from multiple images of the target object, the computer may remove low-quality images that are not close to the standard feature of the target object from the multiple images of the target object. Thus, the computer may obtain high-quality images that may reflect the standard feature of the target object. As such, the accuracy of image processing may be improved when the trusted images of the target object are used for image processing.

Figure 3:
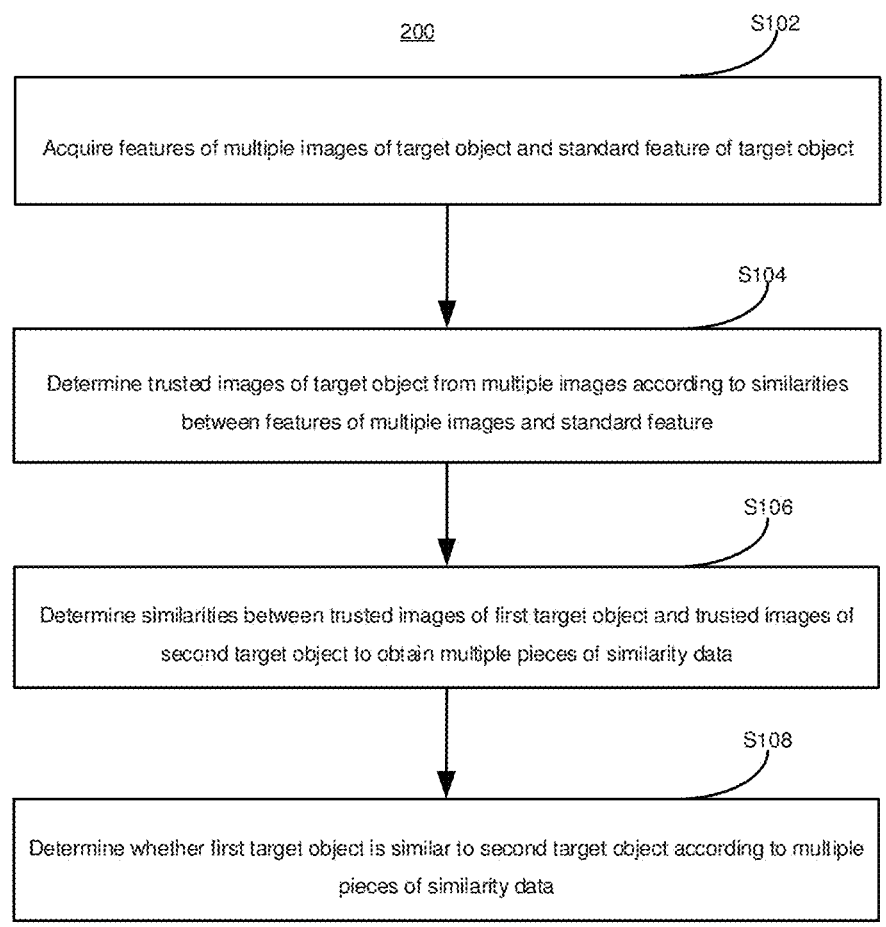
FIG. 3 is a flowchart of an image processing method according to an embodiment.

FIG. 3 is a flowchart of an image processing method 200 according to an embodiment. With the method 200, whether two target objects are similar may be compared on the basis of acquiring trusted images of the target objects. The method 200 may be suitable for a scenario where the target object is a natural person. The method 200 may be performed by a computer, e.g., a server. As shown in FIG. 3, the method 200 further includes the following steps on the basis of FIG. 1.

In step S106, the computer determines similarities between trusted images of a first target object and trusted images of a second target object to obtain multiple pieces of similarity data.

In step S108, according to the multiple pieces of similarity data, the computer determines whether the first target object is similar to the second target object.

In some embodiments, the target object in step S102 may include multiple target objects, which may be a first target object, a second target object, a third target object, and so on. Therefore, the computer may determine the trusted images of the first target object and the trusted images of the second target object according to step S102 and step S104, respectively.

In step S106, in some embodiments, the computer may determine the similarities between the trusted images of the first target object and the trusted images of the second target object by determining a similarity between each trusted image of the first target object and each trusted image of the second target object. The method of calculating the similarities is not limited here, and may be selected as required. After the similarity between each trusted image of the first target object and each trusted image of the second target object has been calculated, the quantity of similarity data obtained by calculation may be equal to the product of the quantity of the trusted images of the first target object and the quantity of the trusted images of the second target object.

In step S108, in some embodiments, whether the first target object is similar to the second target object may be determined according to the multiple pieces of similarity data in the following manner (c1) or (c2).

(c1) The computer may determine that the first target object is similar to the second target object if an average value of the multiple pieces of similarity data is greater than or equal to a preset average threshold, (c2) The computer may determine that the first target object is similar to the second target object if a distribution of the multiple pieces of similarity data meets a preset similarity distribution requirement.

In the manner (c1), in some embodiments, the computer may calculate an average value of the multiple pieces of similarity data. The computer may determine that the first target object is similar to the second target object if the average value of the multiple pieces of similarity data is greater than or equal to the preset average threshold. Otherwise, the computer may determine that the first target object is not similar to the second target object. The preset average threshold may be a value preset by the computer.

The computer may set the preset manner according to an implementation scenario of this embodiment.

In the manner (c2), in some embodiments, the computer may calculate a distribution of the multiple pieces of similarity data. The distribution may be represented in the form of a statistical distribution histogram. In the distribution, multiple similarity intervals may be included and the quantity of image pairs corresponding to each similarity interval may be marked.

In some embodiments, the preset similarity distribution requirement may be that a ratio of the quantity of image pairs having similarities greater than or equal to a certain value to the total number of image comparisons is greater than or equal to a preset ratio. In the foregoing distribution, if the ratio is greater than or equal to the preset ratio, the computer may determine that the first target object is similar to the second target object. Otherwise, the computer may determine that the first target object is not similar to the second target object. For example, if the ratio of the quantity of image pairs having similarity scores greater than or equal to 75 to the total number of image comparisons is greater than or equal to 80%, the computer may determine that the first target object is similar to the second target object. Otherwise, the computer may determine that the first target object is not similar to the second target object. As images of the first target object and the second target object are compared in pairs, the computer may determine the quantity of image pairs having similarities greater than or equal to a certain value, and the total number of image comparisons may be equal to the product of the quantity of the trusted images of the first target object and the quantity of the trusted images of the second target object.

In some embodiments, the preset similarity distribution requirement may be that a similarity range of a similarity interval corresponding to the maximum quantity of images is within a preset similarity range. In the distribution, if the similarity range of the similarity interval corresponding to the maximum quantity of images is within the preset similarity range, the computer may determine that the first target object is similar to the second target object. Otherwise, the computer may determine that the first target object is not similar to the second target object. For example, if the similarity range of the similarity interval corresponding to the maximum quantity of images is 80 to 85, which is within the preset similarity range of 70 to 90, the computer may determine that the first target object is similar to the second target object. Otherwise, the computer may determine that the first target object is not similar to the second target object.

By comparing the manners (c1) and (c2), it can be seen that in the manner (c1), the preset average threshold may be used to simply and quickly determine whether the first target object is similar to the second target object. In the manner (c2), the computer may determine whether the first target object is similar to the second target object according to a distribution of the similarity data. Those of ordinary skill in the art may select either the manner (c1) or the manner (c2) according to requirements of an implementation scenario to determine whether the first target object is similar to the second target object.

Considering that when the quantity of images of the first target object is small and/or the quantity of images of the second target object is small, the quantity of the multiple pieces of similarity data obtained in the above step S106 may be small, which may affect the accuracy of determination in step S108. Therefore, in some embodiments, step S108 may include the follows. The computer may determine whether the quantity of the multiple pieces of similarity data meets a preset quantity requirement. If so, the computer may determine whether the first target object is similar to the second target object according to the multiple pieces of similarity data. The computer may ensure accuracy of the determination on the similarity between the first target object and the second target object by determining that the quantity of the multiple pieces of similarity data obtained in step S106 meets the preset quantity requirement.

In some embodiments, if an algorithm of the computer for determining whether the first target object is similar to the second target object according to the similarity data has high accuracy, the computer may directly determine whether the first target object is similar to the second target object according to the similarity data without determining whether the quantity of the multiple pieces of similarity data obtained in step S106 meets the preset quantity requirement. If the algorithm of the computer for determining whether the first target object is similar to the second target object according to the similarity data has low accuracy, the computer may first determine whether the quantity of the multiple pieces of similarity data obtained in step S106 meets the preset quantity requirement. If so, the computer may determine whether the first target object is similar to the second target object according to the similarity data. Otherwise, the method process is ended.

Figure 4:
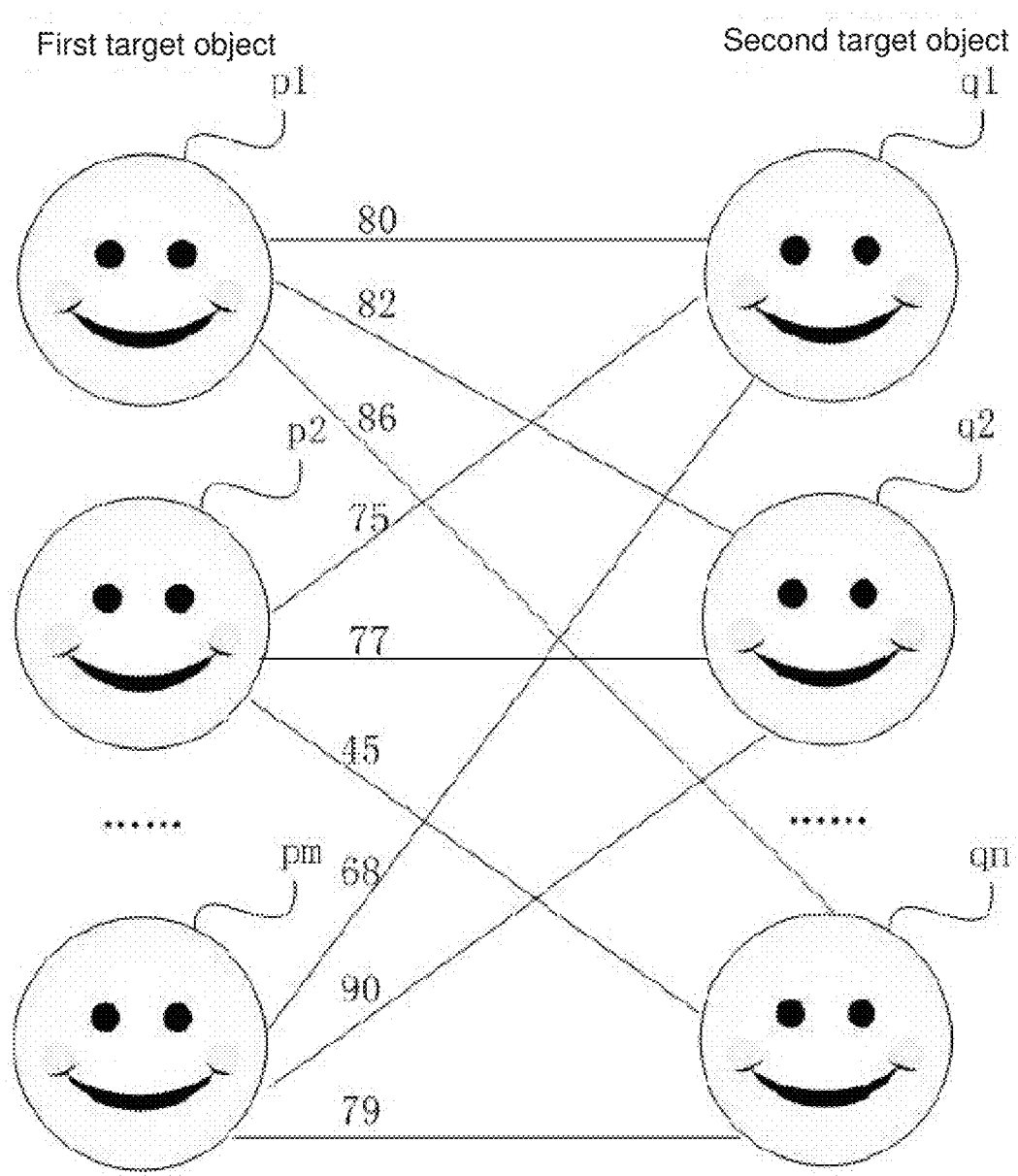
FIG. 4 is a schematic diagram of comparing whether a first target object is similar to a second target object according to trusted images, according to an embodiment.

FIG. 4 is a schematic diagram of comparing according to trusted images whether a first target object is similar to a second target object according to an embodiment. As shown in FIG. 4, the first target object includes m trusted pictures p1, p2, p3, . . . and pm (three pictures are shown as examples for illustration in FIG. 4), and the second target object includes n trusted pictures q1, q2, q3, . . . and qn (three pictures are shown as examples for illustration in FIG. 4). A similarity between each trusted picture of the first target object and each trusted picture of the second target object is calculated respectively to obtain multiple similarity scores. Some similarity scores are marked in FIG. 4. Statistical analysis is conducted on all the similarity scores to obtain an average score of 85, which is greater than or equal to a preset average threshold, and the computer may determine that the first target object is similar to the second target object.

Figure 5:
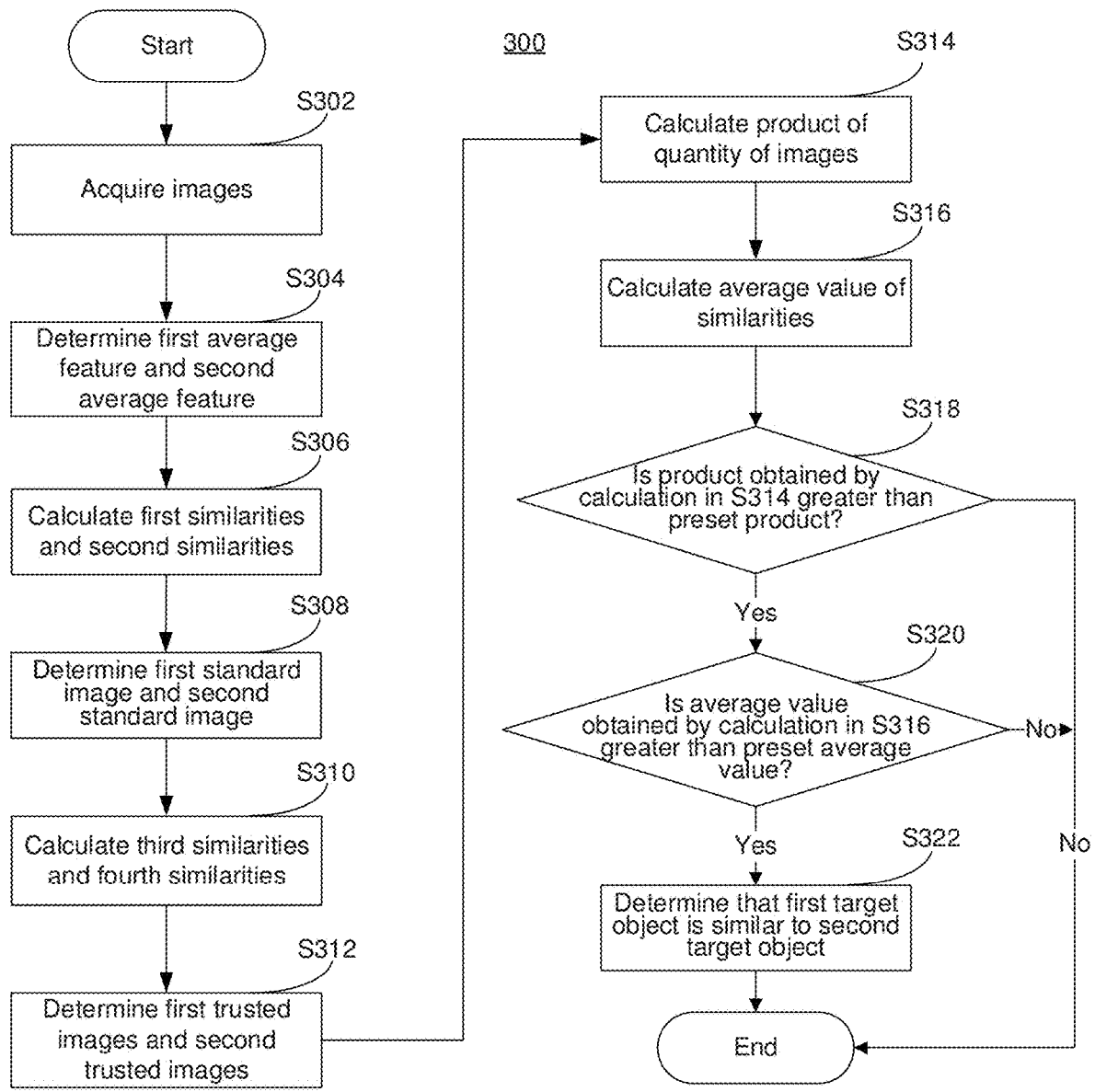
FIG. 5 is a flowchart of an image processing method according to an embodiment.

Based on the above described methods, another image processing method is provided in this embodiment, which includes a process of determining trusted images as well as a process of determining whether two target objects are similar. FIG. 5 is a flowchart of an image processing method 300 according to an embodiment. As shown in FIG. 5, the method 300 includes the following steps.

In step S302, a computer acquires images. For example, the computer may acquire multiple images of a first target object and multiple images of a second target object.

In step S304, the computer determines a first average feature and a second average feature. For example, the computer may determine an average feature of the multiple images of the first target object as the first average feature, and determine an average feature of the multiple images of the second target object as the second average feature.

In step S306, the computer calculates first similarities and second similarities. For example, the computer may respectively calculate a first similarity between a feature of each image of the first target object and the first average feature in the multiple images of the first target object, and respectively calculate a second similarity between a feature of each image of the second target object and the second average feature in the multiple images of the second target object.

In step S308, the computer determines a first standard image and a second standard image. For example, the computer may determine an image having the largest first similarity as the first standard image of the first target object, and determine an image having the largest second similarity as the second standard image of the second target object.

In step S310, the computer calculates third similarities and fourth similarities. For example, the computer may respectively calculate the third similarity between each image of the first target object and the first standard image in the multiple images of the first target object, and respectively calculate the fourth similarity between each image of the second target object and the second standard image in the multiple images of the second target object.

In step S312, the computer determines first trusted images and second trusted images. For example, the computer may determine images having the third similarities greater than or equal to a certain value as the first trusted images of the first target object, and determine images having the fourth similarities greater than or equal to a certain value as the second trusted images of the second target object.

In step S314, the computer calculates the product of the quantity of images. For example, the computer may calculate the product of the quantity of the first trusted images and the quantity of the second trusted images.

In step S316, the computer calculates an average value of similarities. For example, the computer may respectively calculate a similarity between each first trusted image and each second trusted image to obtain multiple pieces of similarity data, and further calculate an average value of the multiple pieces of similarity data.

In step S318, the computer determines whether the product obtained by calculation in step S314 is greater than a preset product. If so, step S320 is performed. Otherwise, the comparison is ended.

In step S320, the computer determines whether the average value obtained by calculation in step S316 is greater than a preset average value. If so, step S322 is performed. Otherwise, the comparison is ended.

In step S322, the computer determines that the first target object is similar to the second target object.

In the image processing methods shown in FIG. 1 to FIG. 5, the similarity calculation method is not limited when a similarity is calculated, such as a similarity between each image and the average feature, a similarity between each image and the standard image, or a similarity between a trusted image of the first target object and a trusted image of the second target object. In some embodiments, the computer may calculate a Euclidean distance or cosine distance between feature vectors to determine the similarity. In some embodiments, when the target object is a natural person, an Eigenface-based comparison method may also be adopted, and so on, as long as there are indicators for quantifying similarities between features. In some embodiments, principal component analysis (PCA), Local Face Analysis, Neural Networks and so on may be used when calculating the Euclidean distance or cosine distance.

In some embodiments, the target object may be a natural person. With the method in this embodiment, low-quality images of the natural person may be excluded from base images of the natural person saved in a system to select trusted images of the natural person. For example, the trusted images of the natural person may be images with proper light, correct facial position and clarity without heavy makeup or exaggerated accessories. Facial features of the natural person may be reflected through the trusted images. With the method in this embodiment, whether two natural persons are similar may further be determined based on trusted images of the two natural persons. The method in this embodiment has simple process and accurate effect, and may be widely used in the field of face recognition, especially in identifying identical twins, positioning target persons, and other fields, and has potential social values, such as identifying identical twins who both have had their faces collected, looking for abducted children, or tracking fugitives who change their names.

Figure 6:
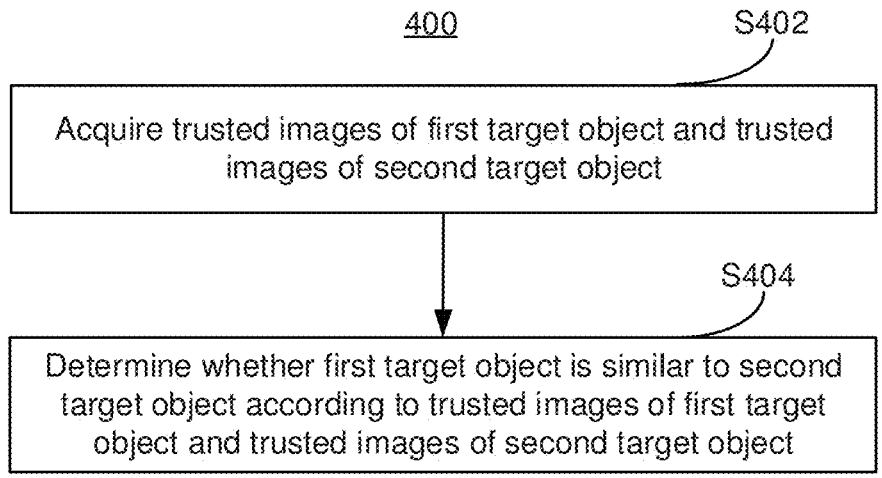
FIG. 6 is a flowchart of an image processing method according to an embodiment.

Further, based on the foregoing methods in FIG. 1 to FIG. 5, an image processing method is further provided in an embodiment of this application. FIG. 6 is a flowchart of an image processing method 400 according to an embodiment. The method 400 may be performed by a computer, e.g., a server. The differences between the method 400 and the methods in FIG. 1 to FIG. 5 are focused hereinafter. Reference may be made to the foregoing description in FIG. 1 to FIG. 5 for identical or similar parts. As shown in FIG. 6, the method 400 includes the following steps.

In step S402, the computer acquires trusted images of a first target object and trusted images of a second target object.

In step S404, the computer determines whether the first target object is similar to the second target object according to the trusted images of the first target object and the trusted images of the second target object.

In some embodiments, the computer may determine the trusted images of the first target object from multiple images of the first target object. Similarities between features of the trusted images of the first target object and a standard feature of the first target object may meet a first preset similarity requirement. The computer may determine the trusted images of the second target object from multiple images of the second target object. Similarities between features of the trusted images of the second target object and a standard feature of the second target object may meet a second preset similarity requirement.

With the image processing method 400, the trusted images of the first target object may be images selected from the multiple images of the first target object. The similarities between the features of the images and the standard feature of the first target object may meet the first preset similarity requirement. The trusted images of the second target object may be images selected from the multiple images of the second target object. The similarities between the features of the images and the standard feature of the second target object may meet the second preset similarity requirement. Therefore, according to the image processing method in this embodiment, the computer may determine images more similar to a standard feature of a target object and capable of reflecting the standard feature of the target object from multiple images of the target object based on the standard feature of the target object. Thus, the selected images may be suitable for image processing, and an effect of image processing may be improved. Moreover, according to the method in this embodiment, the computer may determine whether the first target object is similar to the second target object based on trusted images of the first target object and trusted images of the second target object. Therefore, the image processing method in this embodiment may have a good effect of image processing and an accurate determination result, and may accurately determine whether the first target object is similar to the second target object.

It can be seen according to the description of FIG. 1 to FIG. 5 that, in some embodiments, the standard feature of the first target object may be an average feature of multiple images of the first target object. In some embodiments, the standard feature of the first target object may be a feature in features of the multiple images of the first target object, which is most similar to the average feature of the multiple images of the first target object. In some embodiments, the standard feature of the second target object may be an average feature of multiple images of the second target object. In some embodiments, the standard feature of the second target object may be a feature in features of the multiple images of the second target object, which is most similar to the average feature of the multiple images of the second target object. The foregoing first preset similarity requirement may be the same as or different from the foregoing second preset similarity requirement.

In some embodiments, the accuracy of determining whether the first target object and the second target object are similar may be enhanced by adopting a unified standard to determine the trusted images of the first target object and the trusted images of the second target object. For example, the computer may determine the standard feature of the first target object and the standard feature of the second target object in the same manner. In some embodiments, each of the standard features may be an average feature of multiple images. In some embodiments, each of the standard features may be a feature in features of the multiple images, which is most similar to an average feature of the multiple images. In some embodiments, the first preset similarity requirement may be the same as the second preset similarity requirement.

Explanations to the first preset similarity requirement and the second preset similarity requirement are set forth in the description of FIG. 1 to FIG. 5. Reference may also be made to the description of FIG. 1 to FIG. 5 for the specific process of acquiring trusted images of the first target object and trusted images of the second target object in the step S402, which will not be elaborated here.

In the step S404, in some embodiments, the computer may determine whether the first target object is similar to the second target object according to the trusted images of the first target object and the trusted images of the second target object, such as in the following manner (d1) or (d2).

(d1) The computer may determine that the first target object is similar to the second target object if an average value of multiple pieces of similarity data between the trusted images of the first target object and the trusted images of the second target object is greater than or equal to a preset average threshold.

(d2) The computer may determine that the first target object is similar to the second target object if distributions of multiple pieces of similarity data between the trusted images of the first target object and the trusted images of the second target object meet a preset similarity distribution requirement.

Reference may be made to the manners (c1) and (c2) for the explanations to the manners (d1) and (d2), which will not be elaborated here.

In some embodiments, the computer may search a database of target objects for two target objects with similar features, such as two natural persons with similar appearance. For example, the first target object may be any target object in the database of target objects, and the second target object may be any target object in the database of target objects other than the first target object. In this manner, the computer may find out two target objects with similar features in the database.

In some embodiments, the computer may search a database for a target object similar to a specified target object, such as another natural person similar in appearance to a specified natural person. For example, the first target object may be a target object specified by a user, and the second target object may be any target object in the database of target objects. In this manner, the computer may find out a target object similar to the specified target object in the database.

Figure 7:
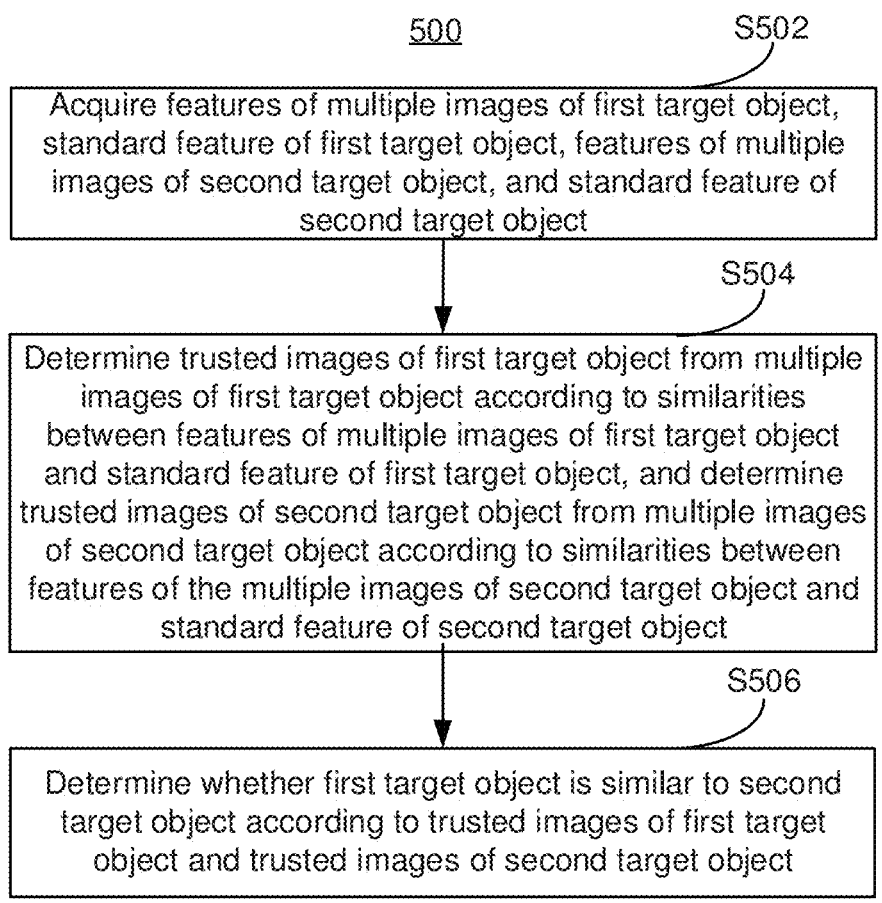
FIG. 7 is a flowchart of an image processing method according to an embodiment.

Further, based on the methods in FIG. 1 to FIG. 5, an image processing method is further provided in an embodiment of this application. FIG. 7 is a flowchart of an image processing method 500 according to an embodiment. The method 500 is performed by a computer, e.g., a server. The differences between the method 500 and the methods in FIG. 1 to FIG. 5 are focused hereinafter. Reference may be made to the description of FIG. 1 to FIG. 5 for identical and similar parts. As shown in FIG. 7, the method 500 includes the following steps.

In step S502, the computer acquires features of multiple images of a first target object, a standard feature of the first target object, features of multiple images of a second target object, and a standard feature of the second target object.

In step S504, the computer determines trusted images of the first target object from the multiple images of the first target object according to similarities between the features of the multiple images of the first target object and the standard feature of the first target object, and determines trusted images of the second target object from the multiple images of the second target object according to similarities between the features of the multiple images of the second target object and the standard feature of the second target object. In some embodiments, similarities between features of the trusted images of the first target object and the standard feature thereof may meet a first preset similarity requirement. Similarities between features of the trusted images of the second target object and the standard feature thereof may meet a second preset similarity requirement.

In step S506, the computer determines whether the first target object is similar to the second target object according to the trusted images of the first target object and the trusted images of the second target object.

According to the image processing method 500, the computer may first acquire the features of multiple images of the target object and the standard feature of the target object, then determine the trusted images of the target object in the multiple images according to the similarities between the features of the multiple images and the standard feature. In some embodiments, the similarities between features of the trusted images and the standard feature may meet a preset similarity requirement. The computer may determine whether the two target objects are similar to each other according to trusted images of two target objects. According to the image processing method 500, the computer may determine trusted images more similar to a standard feature of a target object and capable of reflecting the standard feature of the target object from multiple images of the target object based on the standard feature of the target object. In this way, the selected trusted images may be suitable for image processing. Thus, an effect of image processing may be improved. The computer may determine whether the first target object is similar to the second target object based on the trusted images of the first target object and trusted images of the second target object, which may improve the accuracy of determination on the similarity between the two target objects, thus may accurately determine whether the two target objects are similar to each other.

Reference may be made to the description of steps S102 and S104 in FIG. 1 and FIG. 2 for the processes of steps S502 and S504. Reference may be made to the description of step S404 in FIG. 6 for the process of step S506, which will not be elaborated here.

Reference may be made to the description of FIG. 1 to FIG. 6 for the explanations of the standard feature in FIG. 7. In some embodiments, the first preset similarity requirement may be the same as the second preset similarity requirement. In some embodiments, the first preset similarity requirement may be different from the second preset similarity requirement. In some embodiments, the accuracy of determining whether the first target object is similar to the second target object may be enhanced by adopting a unified standard to determine the trusted images of the first target object and the trusted images of the second target object. For example, the computer may determine the standard feature of the first target object and the standard feature of the second target object in the same manner. In some embodiments, each of the standard features may be an average feature of multiple images. In some embodiments, each of the standard features may be a feature in features of the multiple images, which is most similar to an average feature of the multiple images. In some embodiments, the first preset similarity requirement may be the same as the second preset similarity requirement.

According to the methods shown in FIG. 1 to FIG. 7, the computer may determine trusted images of a target object, based on which the computer may determine whether two target objects are similar to each other. The methods are simple in the determination process and accurate in the determination result, and may be widely used in face recognition, twin screening, positioning of target persons and other fields.

Figure 8:
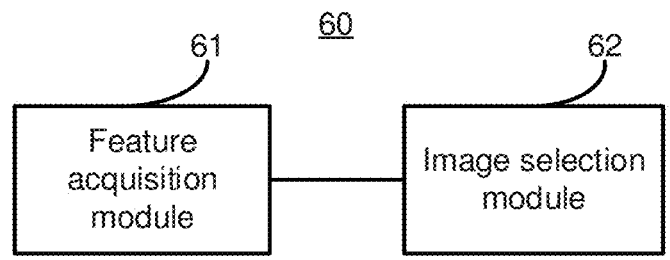
FIG. 8 is a schematic diagram of an image processing apparatus according to an embodiment.

Further, based on the foregoing methods shown in FIG. 1 to FIG. 7, an image processing apparatus is provided in an embodiment of this application. FIG. 8 is a schematic diagram of an image processing apparatus 60 according to an embodiment. As shown in FIG. 8, the apparatus 60 includes a feature acquisition module 61 configured to acquire features of multiple images of a target object and a standard feature of the target object, and an image selection module 62 configured to determine trusted images of the target object from the multiple images according to similarities between the features of the multiple images and the standard feature. In some embodiments, similarities between features of the trusted images and the standard feature may meet a preset similarity requirement.

In some embodiments, the feature acquisition module 61 may acquire an average feature of the multiple images and determine it as the standard feature of the target object. In some embodiments, the feature acquisition module 61 may acquire an average feature of the multiple images and determine a feature in the features of the multiple images that is most similar to the average feature as the standard feature of the target object.

In some embodiments, the image selection module 62 may determine some or all of images among the multiple images having similarities between features thereof and the standard feature greater than or equal to a preset similarity threshold as the trusted images of the target object. In some embodiments, the image selection module 62 may determine distribution data of the similarities between the features of the multiple images and the standard feature, a similarity interval in the distribution data in which an image density is greater than or equal to a preset density, and some or all images corresponding to the determined similarity interval as the trusted images of the target object.

The apparatus 60 may further include a similarity determination module (not shown) configured to determine similarities between trusted images of a first target object and trusted images of a second target object to obtain multiple pieces of similarity data, and a similarity decision module (not shown) configured to determine whether the first target object is similar to the second target object according to the multiple pieces of similarity data.

In some embodiments, the similarity decision module may determine that the first target object is similar to the second target object if an average value of the multiple pieces of similarity data is greater than or equal to a preset average threshold. In some embodiments, the similarity decision module may determine that the first target object is similar to the second target object if distributions of the multiple pieces of similarity data meets a preset similarity distribution requirement.

In some embodiments, the similarity decision module may determine whether the quantity of the multiple pieces of similarity data meets a preset quantity requirement. If so, the similarity decision module may determine whether the first target object is similar to the second target object according to the multiple pieces of similarity data.

The image processing apparatus 60 may first acquire features of multiple images of a target object and a standard feature of the target object, and then determine trusted images of the target object from the multiple images according to similarities between features of the multiple images and the standard feature. In some embodiments, similarities between features of the trusted images and the standard feature may meet a preset similarity requirement. It may be seen that the image processing apparatus 60 may determine, based on the standard feature of the target object, the trusted images more similar to and capable of reflecting the standard feature of the target object from the multiple images of the target object. In this way, the selected trusted images may be suitable for image processing. Thus, an effect of image processing may be improved.

Figure 9:
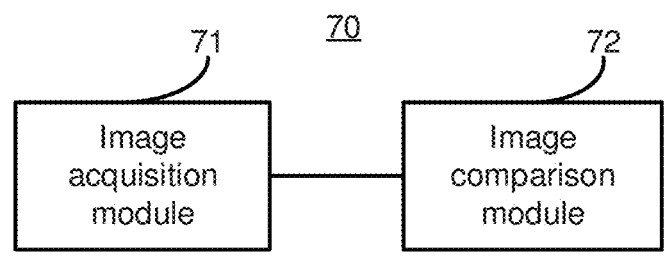
FIG. 9 is a schematic diagram of an image processing apparatus according to an embodiment.

Further, based on the foregoing methods shown in FIG. 1 to FIG. 7, another image processing apparatus is further provided in an embodiment of this application. FIG. 9 is a schematic diagram of an image processing apparatus 70 according to an embodiment. As shown in FIG. 9, the apparatus 70 includes an image acquisition module 71 configured to acquire trusted images of a first target object and trusted images of a second target object, and an image comparison module 72 configured to determine whether the first target object is similar to the second target object according to the trusted images of the first target object and the trusted images of the second target object.

In some embodiments, the trusted images of the first target object may be images determined from multiple images of the first target object. Similarities between features of the trusted images of the first target object and a standard feature of the first target object may meet a first preset similarity requirement. In some embodiments, the trusted images of the second target object may be images determined from multiple images of the second target object. Similarities between features of the trusted images of the second target object and a standard feature of the second target object may meet a second preset similarity requirement.

In some embodiments, the standard feature of the first target object may be an average feature of multiple images of the first target object. In some embodiments, the standard feature of the first target object may be a feature in features of the multiple images of the first target object, which is most similar to the average feature of the multiple images of the first target object. In some embodiments, the standard feature of the second target object may be an average feature of multiple images of the second target object. In some embodiments, the standard feature of the second target object may be a feature in features of the multiple images of the second target object, which is most similar to the average feature of the multiple images of the second target object.

In some embodiments, the image comparison module 72 may determine that the first target object is similar to the second target object if an average value of multiple pieces of similarity data between the trusted images of the first target object and the trusted images of the second target object is greater than or equal to a preset average threshold. In some embodiments, the image comparison module 72 may determine that the first target object is similar to the second target object if distributions of multiple pieces of similarity data between the trusted images of the first target object and the trusted images of the second target object meet a preset similarity distribution requirement.

In some embodiments, the first target object may be any target object in a database of target objects, and the second target object may be any target object in the database other than the first target object. In some embodiments, the first target object may be a target object specified by a user, and the second target object may be any target object in a database of target objects.

According to the image processing apparatus in this embodiment, the trusted images of the first target object may be images selected from multiple images of the first target object, and similarities between features of the images and a standard feature of the first target object may meet a first preset similarity requirement. The trusted images of the second target object may be images selected from multiple images of the second target object, and similarities between features of the images and a standard feature of the second target object may meet a second preset similarity requirement. Therefore, according to the image processing apparatus in this embodiment, the computer may determine images more similar to a standard feature of a target object and capable of reflecting the standard feature of the target object from multiple images of the target object based on the standard feature of the target object. Thus, the selected images may be suitable for image processing, and an effect of image processing may be improved. Moreover, the apparatus in this embodiment may determine whether the first target object is similar to the second target object based on trusted images of the first target object and trusted images of the second target object. Therefore, the image processing apparatus in this embodiment may have a good effect of image processing and an accurate determination result, and may accurately determine whether the first target object is similar to the second target object.

Figure 10:
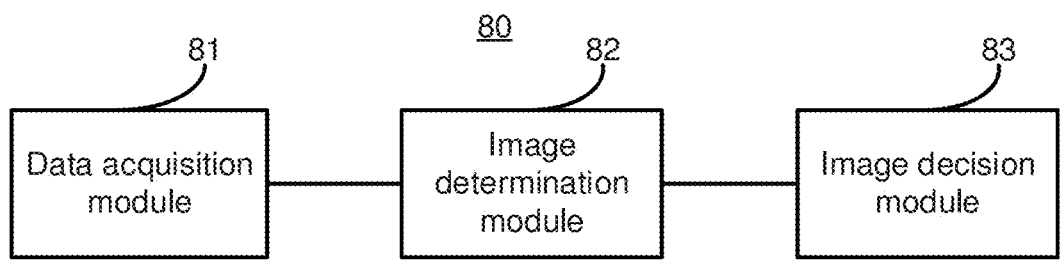
FIG. 10 is a schematic diagram of an image processing apparatus according to an embodiment.

Further, based on the foregoing methods shown in FIG. 1 to FIG. 7, another image processing apparatus is further provided in an embodiment of this application. FIG. 10 is a schematic diagram of an image processing apparatus 80 according to an embodiment. As shown in FIG. 10, the apparatus 80 includes a data acquisition module 81 configured to acquire features of multiple images of a first target object, a standard feature of the first target object, features of multiple images of a second target object, and a standard feature of the second target object, and an image determination module 82 configured to determine trusted images of the first target object from the multiple images of the first target object according to similarities between the features of the multiple images of the first target object and the standard feature of the first target object, and determine trusted images of the second target object from the multiple images of the second target object according to similarities between the features of the multiple images of the second target object and the standard feature of the second target object. In some embodiments, similarities between features of the trusted images of the first target object and the standard feature thereof may meet a first preset similarity requirement, and similarities between features of the trusted images of the second target object and the standard feature thereof may meet a second preset similarity requirement.

The apparatus 80 also includes an image decision module 83 configured to determine whether the first target object is similar to the second target object according to the trusted images of the first target object and the trusted images of the second target object.

In some embodiments, the first preset similarity requirement may be the same as the second preset similarity requirement. In some embodiments, the first preset similarity requirement may be different from the second preset similarity requirement.

The image processing apparatus 80 may first acquire features of multiple images of a target object and a standard feature of the target object, then determine trusted images of the target object from the multiple images according to similarities between the features of the multiple images and the standard feature. In some embodiments, similarities between features of the trusted images and the standard feature may meet a preset similarity requirement. The image processing apparatus 80 may determine whether the two target objects are similar to each other according to trusted images of two target objects. According to this embodiment, the image processing apparatus 80 may determine trusted images more similar to a standard feature of a target object and capable of reflecting the standard feature of the target object from multiple images of the target object based on the standard feature of the target object. In this way, the selected trusted images may be suitable for image processing. Thus, an effect of image processing may be improved. The image processing apparatus 80 may determine whether the first target object is similar to the second target object based on trusted images of the first target object and trusted images of the second target object, which may improve the accuracy of determination on the similarity between the two target objects, thus may accurately determine whether the two target objects are similar to each other.

Figure 11:
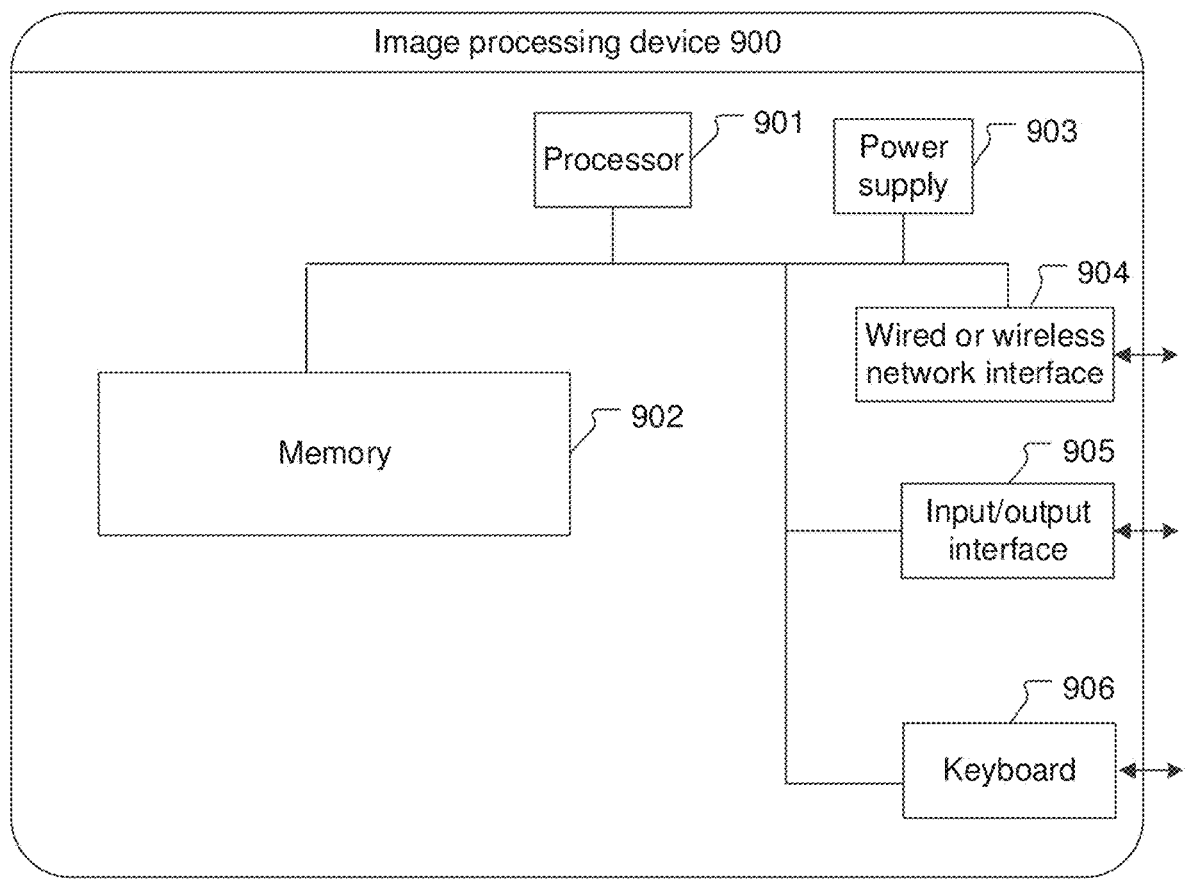
FIG. 11 is a schematic diagram of an image processing device according to an embodiment.

Further, based on the methods shown in FIG. 1 to FIG. 7, an image processing device 900 is further provided in embodiments of the specification, as shown in FIG. 11.

The image processing device 900 may vary greatly depending on configuration or performance, and may include a processor 901 and a memory 902. The processor 901 may include one or more dedicated processing units, application-specific integrated circuits (ASICs), field-programmable gate arrays (FPGAs), or various other types of processors or processing units. The processor 901 is coupled with the memory 902 and configured to execute instructions stored in the memory 902 to perform the above described methods.

The memory 902 may include a non-permanent memory, a random access memory (RAM) and/or a non-volatile memory (such as a read-only memory (ROM) or a flash memory (flash RAM)), etc.

The memory 902 may store one or more applications or data. The memory 902 may include a non-permanent memory, a random access memory (RAM) and/or a non-volatile memory (such as a read-only memory (ROM) or a flash memory (flash RAM)), etc. An application stored in the memory 902 may include one or more modules (not shown in the figure), each of which may include a series of computer-executable instructions for the image processing device 900. Further, the one or more processors 901 may be configured to communicate with the memory 902 and execute the series of computer-executable instructions in the memory 902 to perform the above described methods. The image processing device 900 may further include one or more power supplies 903, one or more wired or wireless network interfaces 904, one or more input/output interfaces 905, one or more keyboards 906, and so on.

In an embodiment, the memory 902 of the image processing device 900 stores one or more programs. The one or more programs may include one or more modules, each of which may include a series of computer-executable instructions for the image processing device 900. The processor 901 is configured to execute the one or more programs to perform the following operations.

The processor 901 is configured to perform acquiring features of multiple images of a target object and a standard feature of the target object.

The processor 901 is configured to perform determining trusted images of the target object from the multiple images according to similarities between the features of the multiple images and the standard feature. In some embodiments, similarities between features of the trusted images and the standard feature may meet a preset similarity requirement.

In some embodiments, in acquiring the standard feature of the target object, the processor 901 is configured to acquire an average feature of the multiple images, and determine the average feature of the multiple images as the standard feature of the target object. In some embodiments, in acquiring the standard feature of the target object, the processor 901 is configured to acquire an average feature of the multiple images, and determine a feature in the features of the multiple images that is most similar to the average feature as the standard feature of the target object.

In some embodiments, in determining trusted images of the target object from the multiple images according to similarities between the features of the multiple images and the standard feature, the processor 901 is configured to determine some or all of images among the multiple images having similarities between features thereof and the standard feature greater than or equal to a preset similarity threshold as the trusted images of the target object. In some embodiments, in determining trusted images of the target object from the multiple images according to similarities between the features of the multiple images and the standard feature, the processor 901 is configured to determine distribution data of the similarities between the features of the multiple images and the standard feature, determine a similarity interval in the distribution data in which an image density is greater than or equal to a preset density, and determine some or all images corresponding to the determined similarity interval as the trusted images of the target object.

In some embodiments, the processor 901 may further determine similarities between trusted images of a first target object and trusted images of a second target object to obtain multiple pieces of similarity data. The processor 901 may further determine whether the first target object is similar to the second target object according to the multiple pieces of similarity data.

In some embodiments, in determining whether the first target object is similar to the second target object according to the multiple pieces of similarity data, the processor 901 is configured to determine that the first target object is similar to the second target object based on a first determination that an average value of the multiple pieces of similarity data is greater than or equal to a preset average threshold or a second determination that a distribution of the multiple pieces of similarity data meets a preset similarity distribution requirement.

In some embodiments, in determining whether the first target object is similar to the second target object according to the multiple pieces of similarity data, the processor 901 is configured to determine whether the quantity of the multiple pieces of similarity data meets a preset quantity requirement. If so, the processor 901 may further determine whether the first target object is similar to the second target object according to the multiple pieces of similarity data.

The image processing device 900 may first acquire features of multiple images of a target object and a standard feature of the target object, and then determine trusted images of the target object from the multiple images according to similarities between features of the multiple images and the standard feature. In some embodiments, similarities between features of the trusted images and the standard feature may meet a preset similarity requirement. It may be shown that the image processing device 900 may determine, based on a standard feature of a target object, trusted images more similar to and capable of reflecting the standard feature of the target object from multiple images of the target object. In this way, the selected trusted images may be suitable for image processing. Thus, an effect of image processing may be improved.

In another embodiment, the memory 902 of the image processing device 900 stores one or more programs. The one or more programs may include one or more modules, each of which may include a series of computer-executable instructions for the image processing device 900. The processor 901 is configured to execute the one or more programs to perform the following operations.

The processor 901 is configured to perform acquiring trusted images of a first target object and trusted images of a second target object.

The processor 901 is configured to perform determining whether the first target object is similar to the second target object according to the trusted images of the first target object and the trusted images of the second target object. In some embodiments, the trusted images of the first target object may be images determined from multiple images of the first target object. Similarities between features of the trusted images of the first target object and a standard feature of the first target object may meet a first preset similarity requirement. In some embodiments, the trusted images of the second target object may be images determined from multiple images of the second target object. Similarities between features of the trusted images of the second target object and a standard feature of the second target object may meet a second preset similarity requirement.

In some embodiments, the standard feature of the first target object may be an average feature of the multiple images of the first target object. In some embodiments, the standard feature of the first target object may be a feature in features of the multiple images of the first target object that is most similar to an average feature of the multiple images of the first target object. In some embodiments, the standard feature of the second target object may be an average feature of the multiple images of the second target object. In some embodiments, the standard feature of the second target object may be a feature in features of the multiple images of the second target object that is most similar to an average feature of the multiple images of the second target object.

In some embodiments, in determining whether the first target object is similar to the second target object according to the trusted images of the first target object and the trusted images of the second target object, the processor 901 is configured to determine that the first target object is similar to the second target object based on a first determination that an average value of multiple pieces of similarity data between the trusted images of the first target object and the trusted images of the second target object is greater than or equal to a preset average threshold or a second determination that a distribution of multiple pieces of similarity data between the trusted images of the first target object and the trusted images of the second target object meets a preset similarity distribution requirement.

In some embodiments, the first target object may be any target object in a database of target objects, and the second target object may be any target object in the database other than the first target object. In some embodiments, the first target object may be a target object specified by a user. The second target object may be any target object in a database of target objects.

According to the image processing device 900 in this embodiment, the trusted images of the first target object may be images selected from multiple images of the first target object. Similarities between features of the images and a standard feature of the first target object may meet a first preset similarity requirement. In some embodiments, the trusted images of the second target object may be images selected from multiple images of the second target object. Similarities between features of the images and a standard feature of the second target object may meet a second preset similarity requirement. Therefore, according to the image processing device 900 in this embodiment, images more similar to a standard feature of a target object and capable of reflecting the standard feature of the target object may be determined from multiple images of the target object based on the standard feature of the target object. Thus, the selected images may be suitable for image processing, and an effect of image processing may be improved. Moreover, the image processing device 900 in this embodiment may determine whether the first target object is similar to the second target object based on trusted images of the first target object and trusted images of the second target object. Therefore, the image processing device 900 in this embodiment may have a good effect of image processing and an accurate determination result, in which whether the first target object is similar to the second target object may be accurately determined.

In another embodiment, the memory 902 of the image processing device 900 stores one or more programs. The one or more programs may include one or more modules, each of which may include a series of computer-executable instructions for the image processing device 900. The processor 901 is configured to execute the one or more programs to perform the following operations.

The processor 901 is configured to perform acquiring features of multiple images of a first target object, a standard feature of the first target object, features of multiple images of a second target object, and a standard feature of the second target object.

The processor 901 is configured to perform determining trusted images of the first target object from the multiple images of the first target object according to similarities between the features of the multiple images of the first target object and the standard feature of the first target object, and determining trusted images of the second target object from the multiple images of the second target object according to similarities between the features of the multiple images of the second target object and the standard feature of the second target object. In some embodiments, similarities between features of the trusted images of the first target object and the standard feature thereof may meet a first preset similarity requirement. Similarities between features of the trusted images of the second target object and the standard feature thereof may meet a second preset similarity requirement.

The processor 901 is configured to perform determining whether the first target object is similar to the second target object according to the trusted images of the first target object and the trusted images of the second target object.

In some embodiments, the first preset similarity requirement may be the same as the second preset similarity requirement. In some embodiments, the first preset similarity requirement may be different from the second preset similarity requirement.

The image processing device 900 in this embodiment may first acquire features of multiple images of a target object and a standard feature of the target object, then determine trusted images of the target object from the multiple images according to similarities between the features of the multiple images and the standard feature. In some embodiments, similarities between features of the trusted images and the standard feature may meet a preset similarity requirement. The image processing device 900 may determine whether the two target objects are similar to each other according to trusted images of two target objects. In this embodiment, the image processing device 900 may determine trusted images more similar to a standard feature of a target object and capable of reflecting the standard feature of the target object from multiple images of the target object based on the standard feature of the target object. In this way, the selected trusted images may be suitable for image processing. Thus, an effect of image processing may be improved. The image processing device 900 may determine whether the first target object is similar to the second target object based on trusted images of the first target object and trusted images of the second target object, which may improve the accuracy of determination on the similarity between the two target objects, thus accurately determining whether the two target objects are similar to each other.

Further, based on the methods shown in FIG. 1 to FIG. 7, a non-transitory storage medium having computer-executable instructions stored thereon is provided in an embodiment. The non-transitory storage medium may be a USB flash disk, an optical disc, a hard disk, and so on. When the computer-executable instructions stored in the non-transitory storage medium are executed by a processor, the following operations may be performed.

The computer-executable instructions are executed by the processor to acquire features of multiple images of a target object and a standard feature of the target object.

The computer-executable instructions are executed by the processor to determine trusted images of the target object from the multiple images according to similarities between the features of the multiple images and the standard feature. In some embodiments, similarities between features of the trusted images and the standard feature may meet a preset similarity requirement.

In some embodiments, the computer-executable instructions to acquire a standard feature of the target object may further include computer-executable instructions to acquire an average feature of the multiple images and to determine the average feature of the multiple images as the standard feature of the target object. In some embodiments, the computer-executable instructions to acquire a standard feature of the target object may further include computer-executable instructions to acquire an average feature of the multiple images and determine a feature in the features of the multiple images that is most similar to the average feature as the standard feature of the target object.

In some embodiments, the computer-executable instructions to determine the trusted images of the target object from the multiple images according to the similarities between the features of the multiple images and the standard feature may further include computer-executable instructions to determine some or all of images among the multiple images having similarities between features thereof and the standard feature greater than or equal to a preset similarity threshold as the trusted images of the target object. In some embodiments, the computer-executable instructions to determine the trusted images of the target object from the multiple images according to the similarities between the features of the multiple images and the standard feature may further include computer-executable instructions to determine distribution data of the similarities between the features of the multiple images and the standard feature, a similarity interval in the distribution data in which an image density is greater than or equal to a preset density, and some or all images corresponding to the determined similarity interval as the trusted images of the target object.

The non-transitory storage medium in this embodiment may further include computer-executable instructions to determine similarities between trusted images of a first target object and trusted images of a second target object to obtain multiple pieces of similarity data, and to determine whether the first target object is similar to the second target object according to the multiple pieces of similarity data.

In this embodiment, the computer-executable instructions to determine whether the first target object is similar to the second target object according to the multiple pieces of similarity data may further include computer-executable instructions to determine that the first target object is similar to the second target object based on a first determination that an average value of the multiple pieces of similarity data is greater than or equal to a preset average threshold or a second determination that a distribution of the multiple pieces of similarity data meets a preset similarity distribution requirement.

In this embodiment, the computer-executable instructions to determine whether the first target object is similar to the second target object according to the multiple pieces of similarity data may further include computer-executable instructions to determine whether the quantity of the multiple pieces of similarity data meets a preset quantity requirement. If so, the processor executes the computer-executable instructions to determine whether the first target object is similar to the second target object according to the multiple pieces of similarity data.

When the executable instructions in the non-transitory storage medium according to this embodiment are executed, the processor may first acquire features of multiple images of a target object and a standard feature of the target object, and then determine trusted images of the target object from the multiple images according to similarities between the features of the multiple images and the standard feature. In some embodiments, similarities between features of the trusted images and the standard feature may meet a preset similarity requirement. As can be seen, when the instructions in the non-transitory storage medium according to this embodiment are executed, the processor may determine images more similar to a standard feature of a target object and capable of reflecting the standard feature of the target object in multiple images of the target object based on the standard feature of the target object. In this way, the selected trusted images may be suitable for image processing. Thus, an effect of image processing may be improved.

In another embodiment, when the computer-executable instructions stored in the non-transitory storage medium are executed by a processor, the following operations may be performed.

The computer-executable instructions are executed by the processor to acquire trusted images of a first target object and trusted images of a second target object.

The computer-executable instructions are executed by the processor to determine whether the first target object is similar to the second target object according to the trusted images of the first target object and the trusted images of the second target object. In some embodiments, the trusted images of the first target object are images determined from multiple images of the first target object, and similarities between features of the trusted images of the first target object and a standard feature of the first target object meet a first preset similarity requirement. The trusted images of the second target object are images determined from multiple images of the second target object, and similarities between features of the trusted images of the second target object and a standard feature of the second target object meet a second preset similarity requirement.

The standard feature of the first target object is an average feature of the multiple images of the first target object; or the standard feature of the first target object is a feature in features of the multiple images of the first target object that is most similar to an average feature of the multiple images of the first target object. The standard feature of the second target object is an average feature of the multiple images of the second target object; or the standard feature of the second target object is a feature in features of the multiple images of the second target object that is most similar to an average feature of the multiple images of the second target object.

The determining whether the first target object is similar to the second target object according to the trusted images of the first target object and the trusted images of the second target object includes: determining that the first target object is similar to the second target object if an average value of multiple pieces of similarity data between the trusted images of the first target object and the trusted images of the second target object is greater than or equal to a preset average threshold; or determining that the first target object is similar to the second target object if distribution of multiple pieces of similarity data between the trusted images of the first target object and the trusted images of the second target object meets a preset similarity distribution requirement.

The first target object is any target object in a database of target objects; and the second target object is any target object in the database other than the first target object; or, the first target object is a target object specified by a user, and the second target object is any target object in a database of target objects.

When the executable instructions in the non-transitory storage medium according to this embodiment are executed, the trusted images of the first target object are images selected from multiple images of the first target object, and similarities between features of the images and a standard feature of the first target object meet a first preset similarity requirement; and the trusted images of the second target object are images selected from multiple images of the second target object, and similarities between features of the images and a standard feature of the second target object meet a second preset similarity requirement. Therefore, when the executable instructions in the non-transitory storage medium according to this embodiment are executed, images more similar to a standard feature of a target object and capable of reflecting the standard feature of the target object may be determined from multiple images of the target object based on the standard feature of the target object, so that all the selected images are suitable for image processing, thus improving an effect of image processing. Moreover, when the executable instructions in the non-transitory storage medium according to this embodiment are executed, whether the first target object is similar to the second target object is determined based on trusted images of the first target object and trusted images of the second target object, therefore when the executable instructions in the non-transitory storage medium according to this embodiment are executed, the effect of image processing is good, the determination result is accurate, and it may be accurately determined whether the first target object is similar to the second target object.

In another embodiment, when computer-executable instructions stored in the non-transitory storage medium are executed by a processor, the following operations may be performed.

The computer-executable instructions are executed by the processor to acquire features of multiple images of a first target object, a standard feature of the first target object, features of multiple images of a second target object, and a standard feature of the second target object.

The computer-executable instructions are executed by the processor to determine trusted images of the first target object from the multiple images of the first target object according to similarities between the features of the multiple images of the first target object and the standard feature of the first target object, and determine trusted images of the second target object from the multiple images of the second target object according to similarities between the features of the multiple images of the second target object and the standard feature of the second target object. In some embodiments, similarities between features of the trusted images of the first target object and the standard feature thereof meet a first preset similarity requirement, and similarities between features of the trusted images of the second target object and the standard feature thereof meet a second preset similarity requirement.

The computer-executable instructions are executed by the processor to determine whether the first target object is similar to the second target object according to the trusted images of the first target object and the trusted images of the second target object.

In some embodiments, the first preset similarity requirement may be the same as the second preset similarity requirement. In some embodiments, the first preset similarity requirement may be different from the second preset similarity requirement.

When the executable instructions in the non-transitory storage medium according to this embodiment are executed, the processor may first acquire features of multiple images of a target object and a standard feature of the target object, then determine trusted images of the target object from the multiple images according to similarities between the features of the multiple images and the standard feature. In some embodiments, similarities between features of the trusted images and the standard feature may meet a preset similarity requirement. The processor may further determine whether the two target objects are similar to each other according to trusted images of two target objects. When the executable instructions in the non-transitory storage medium according to this embodiment are executed, the processor may determine trusted images more similar to a standard feature of a target object and capable of reflecting the standard feature of the target object from multiple images of the target object based on the standard feature of the target object. In this way, the selected trusted images may be suitable for image processing. Thus, an effect of image processing may be improved. The processor may determine whether the first target object is similar to the second target object based on trusted images of the first target object and trusted images of the second target object, which may improve the accuracy of determination on the similarity between the two target objects, thus accurately determining whether the two target objects are similar to each other.

Each of the above described methods, modules, and units may be implemented as software, or hardware, or a combination of software and hardware. For example, a Programmable Logic Device (PLD) (for example, a Field Programmable Gate Array (FPGA)) is such an integrated circuit, and logic functions thereof are determined by a user programming device. Designers program by themselves to integrate a digital system into a PLD, without having a chip manufacturer to design and manufacture a dedicated integrated circuit chip. Moreover, at present, the programming may be implemented by using logic compiler software, instead of manually manufacturing an integrated circuit chip. The software may be similar to a software complier for developing and writing a program, and original codes before compiling may be written in a specific programming language, such as a Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, or Ruby Hardware Description Language (RHDL), among which Very-High-Speed Integrated Circuit Hardware Description Language (VHDL) and Verilog are commonly used. Those skilled in the art should also know that a hardware circuit for implementing the logic method procedure may be easily obtained only by slightly logically programming the method procedure using the above several hardware description languages and programming the method procedure into an integrated circuit.

A controller may be implemented in any suitable manner in the above described devices. For example, the controller may be in the form of a microprocessor or a processor and a computer readable medium storing computer readable program codes (for example, software or firmware) executable by the (micro)processor, a logic gate, a switch, an Application Specific Integrated Circuit (ASIC), a programmable logic controller, or an embedded micro-controller. Examples of the controller may include, but are not limited to, the following micro-controllers: ARC 625D Atmel AT91SAM, Microchip PIC18F26K20, and Silicone Labs C8051F320. A memory controller may also be implemented as a part of control logic of a memory. Those skilled in the art should also know that, in addition to implementing the controller by using pure computer readable program codes, the method steps may be logically programmed to enable the controller to implement the same function in the form of a logic gate, a switch, an application specific integrated circuit, a programmable logic controller and an embedded microcontroller. Therefore, such a controller may be considered as a hardware component, and apparatuses included therein and configured to implement various functions may also be considered as structures inside the hardware component. Alternatively, further, the apparatuses configured to implement various functions may be considered as both software modules for implementing the method and structures inside the hardware component.

The device, apparatus, module or unit illustrated in the foregoing embodiments may be implemented by a computer chip or an entity, or a product having a specific function. A typical implementation device is a computer. For example, the computer may be a personal computer, a laptop computer, a cellular phone, a camera phone, a smart phone, a personal digital assistant, a media player, a navigation device, an email device, a game console, a tablet computer, a wearable device, or a combination of any of these devices.

For ease of description, the apparatus is divided into various modules based on functions, and the modules are described separately. In an embodiment, functions of the various modules may also be implemented in one or ore pieces of software and/or hardware.

Those skilled in the art should understand that the embodiments of the specification may be provided as a method, a device, or a computer program product. Therefore, the embodiments may be implemented in a form of a complete hardware embodiment, a complete software embodiment, or an embodiment combining software and hardware. Moreover, the computer program product may be implemented on one or more computer usable storage media (including, but not limited to, a magnetic disk memory, a CD-ROM, an optical memory, or the like) including computer usable program codes.

The embodiments are described with reference to flowcharts and/or block diagrams of the method, device (system), and computer program product. It should be understood that a computer program instruction may be used to implement each process and/or block in the flowcharts and/or block diagrams and combinations of processes and/or blocks in the flowcharts and/or block diagrams. These computer program instructions may be provided to a general-purpose computer, a special-purpose computer, an embedded processor, or a processor of another programmable data processing device to generate a machine, so that the instructions executed by the computer or the processor of another programmable data processing device may generate an apparatus configured to implement a specified function in one or more processes in the flowcharts and/or in one or more blocks in the block diagrams.

These computer program instructions may also be stored in a computer-readable storage medium that may guide a computer or another programmable data processing device to work in a particular manner, such that the instructions stored in the computer-readable storage medium may generate an article of manufacture that includes an instruction apparatus. The instruction apparatus implements a function specified in one or more processes in the flowcharts and/or in one or more blocks in the block diagrams.

These computer program instructions may also be loaded onto a computer or another programmable data processing device, such that a series of operation steps are performed on the computer or another programmable device, thus generating computer-implemented processing. Therefore, the instructions executed on the computer or another programmable device may provide steps for implementing a function specified in one or more processes in the flowcharts and/or in one or more blocks in the block diagrams.

The computer-readable storage medium may include non-volatile and volatile media as well as movable and non-movable media, and may implement information storage by means of any method or technology. The information may be a computer readable instruction, a data structure, or a module of a program or other data. Examples of the computer-readable storage medium may include, but are not limited to, a phase change memory (PRAM), a static random access memory (SRAM), a dynamic random access memory (DRAM), other types of Random Access Memory (RAM), a Read Only Memory (ROM), an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other agnetic storage devices, or any other non-transmission medium, and may be used to store information accessible to a computing device. The computer-readable storage medium does not include transitory media, such as a modulated data signal and a carrier.

It should be further noted that the terms "include," "comprise" or other variations thereof are intended to cover non-exclusive inclusion, so that a process, method, article, or device including a series of elements not only includes the elements, but also includes other elements not expressly listed, or further includes elements inherent to the process, method, article or device. In the absence of more limitations, an element defined by "including a/an . . . " does not exclude that the process, method, article or device including the element further has other identical elements.

The above described methods may be implemented by computer-executable instructions executed by a computer, for example, a program module. Generally, the program module includes a routine, a program, an object, an assembly, a data structure, or the like for executing a specific task or implementing a specific abstract data type. The above described methods may also be implemented in distributed computing environments. In the distributed computing environments, a task may be executed by remote processing devices connected through a communications network. In the distributed computing environments, the program module may be located in local and remote computer storage media including a storage device.

Various embodiments in this specification are described progressively. The same or similar parts between the embodiments may be referenced to one another. In each embodiment, the part that is different from other embodiments is mainly described. Particularly, the device/apparatus embodiments may be described in a relatively simple manner because they are similar to the method embodiments, and for related parts, reference may be made to the parts described in the method embodiments.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. An image processing method, comprising:
acquiring trusted images of a first target object and trusted images of a second target object; and
determining, according to the trusted images of the first target object and the trusted images of the second target object, whether the first target object is similar to the second target object, wherein:
the trusted images of the first target object are determined from multiple images of the first target object, and similarities between features of the trusted images of the first target object and a standard feature of the first target object meet a first preset similarity requirement; and the trusted images of the second target object are determined from multiple images of the second target object, and similarities between features of the trusted images of the second target object and a standard feature of the second target object meet a second preset similarity requirement.

2. The method of claim 1, wherein the standard feature of the first target object is one of an average feature of the multiple images of the first target object, or a feature in features of the multiple images of the first target object that is most similar to the average feature of the multiple images of the first target object; and the standard feature of the second target object is one of an average feature of the multiple images of the second target object, or a feature in features of the multiple images of the second target object that is most similar to the average feature of the multiple images of the second target object.

3. The method of claim 1, wherein the determining, according to the trusted images of the first target object and the trusted images of the second target object, whether the first target object is similar to the second target object comprises one of:

determining that the first target object is similar to the second target object when an average value of multiple pieces of similarity data between the trusted images of the first target object and the trusted images of the second target object is greater than or equal to a preset average threshold; or determining that the first target object is similar to the second target object when a distribution of multiple pieces of similarity data between the trusted images of the first target object and the trusted images of the second target object meets a preset similarity distribution requirement.

4. The method of claim 1, wherein the first target object is a first target object in a database of target objects, and the second target object is a second target object in the database, wherein the first target object is different from the second target object; or the first target object is a target object specified by a user, and the second target object is a target object in the database.

5. The method of claim 1, further comprising:

acquiring features of the multiple images of the first target object, the standard feature of the first target object, features of the multiple images of the second target object, and the standard feature of the second target object; and determining the trusted images of the first target object from the multiple images of the first target object according to similarities between the features of the multiple images of the first target object and the standard feature of the first target object, and determining the trusted images of the second target object from the multiple images of the second target object according to similarities between the features of the multiple images of the second target object and the standard feature of the second target object.

6. The method of claim 5, wherein the acquiring the standard feature of the first target object comprises one of:

acquiring an average feature of the multiple images of the first target object, and determining the average feature of the multiple images of the first target object as the standard feature of the first target object; or acquiring an average feature of the multiple images of the first target object, and determining a feature in the features of the multiple images of the first target object as the standard feature of the first target object, wherein the determined feature is most similar to the average feature.

7. The method of claim 5, wherein the determining the trusted images of the first target object from the multiple images of the first target object according to the similarities between the features of the multiple images of the first target object and the standard feature of the first target object comprises one of:

determining one or more images of the multiple images of the first target object as the trusted images of the first target object, wherein similarities between features of the one or more images of the multiple images and the standard feature of the first target object are greater than or equal to a preset similarity threshold; or determining distribution data of the similarities between the features of the multiple images of the first target object and the standard feature of the first target object, determining a similarity interval in the distribution data, wherein an image density in the similarity interval is greater than or equal to a preset density, and determining one or more images of the multiple images corresponding to the determined similarity interval as the trusted images of the first target object.

8. The method of claim 5, wherein the determining whether the first target object is similar to the second target object comprises one of:

determining that the first target object is similar to the second target object when an average value of multiple pieces of similarity data is greater than or equal to a preset average threshold; or determining that the first target object is similar to the second target object when a distribution of multiple pieces of similarity data meets a preset similarity distribution requirement.

9. The method of claim 5, wherein the determining whether the first target object is similar to the second target object comprises:

determining whether a quantity of multiple pieces of similarity data meets a preset quantity requirement; and when the quantity of the multiple pieces of similarity data meets the preset quantity requirement, determining, according to the multiple pieces of similarity data, whether the first target object is similar to the second target object.

10. The method of claim 5, wherein the first preset similarity requirement is the same as the second preset similarity requirement, or the first preset similarity requirement is different from the second preset similarity requirement.

11. An image processing device, comprising:

a processor; and a memory storing a computer executable instruction, wherein when executed, the executable instruction causes the processor to:

acquire trusted images of a first target object and trusted images of a second target object; and determine, according to the trusted images of the first target object and the trusted images of the second target object, whether the first target object is similar to the second target object, wherein:

the trusted images of the first target object are determined from multiple images of the first target object, and similarities between features of the trusted images of the first target object and a standard feature of the first target object meet a first preset similarity requirement; and the trusted images of the second target object are determined from multiple images of the second target object, and similarities between features of the trusted images of the second target object and a standard feature of the second target object meet a second preset similarity requirement.

12. The image processing device of claim 11, wherein when executed, the executable instruction further causes the processor to:

acquire features of the multiple images of the first target object, the standard feature of the first target object, features of the multiple images of the second target object, and the standard feature of the second target object; and determine the trusted images of the first target object from the multiple images of the first target object according to similarities between the features of the multiple images of the first target object and the standard feature of the first target object, and determine the trusted images of the second target object from the multiple images of the second target object according to similarities between the features of the multiple images of the second target object and the standard feature of the second target object.

13. A non-transitory computer-readable storage medium having instructions stored thereon that, when executed by a processor of a device, cause the device perform an image processing method, the method comprising:

acquiring trusted images of a first target object and trusted images of a second target object; and determining, according to the trusted images of the first target object and the trusted images of the second target object, whether the first target object is similar to the second target object, wherein:

the trusted images of the first target object are determined from multiple images of the first target object, and similarities between features of the trusted images of the first target object and a standard feature of the first target object meet a first preset similarity requirement; and the trusted images of the second target object are determined from multiple images of the second target object, and similarities between features of the trusted images of the second target object and a standard feature of the second target object meet a second preset similarity requirement.

14. The non-transitory computer-readable storage medium of claim 13, wherein the method further comprises:

acquiring features of the multiple images of the first target object, the standard feature of the first target object, features of the multiple images of the second target object, and the standard feature of the second target object; and determining the trusted images of the first target object from the multiple images of the first target object according to similarities between the features of the multiple images of the first target object and the standard feature of the first target object, and determining the trusted images of the second target object from the multiple images of the second target object according to similarities between the features of the multiple images of the second target object and the standard feature of the second target object.

* * * * *